(12) United States Patent
Yamamura et al.

(10) Patent No.: US 7,142,773 B2
(45) Date of Patent: Nov. 28, 2006

(54) INFORMATION RECORDING AND REPRODUCING APPARATUS WITH A RING BUFFER AND METHOD FOR MONITORING RING BUFFER

(75) Inventors: Gaku Yamamura, Tokorozawa (JP); Ichiro Miyake, Tokorozawa (JP); Tsutomu Takahashi, Tokorozawa (JP); Kenichiro Tada, Tokorozawa (JP); Yasuyuki Noda, Tokorozawa (JP); Kazutomo Watanabe, Tokorozawa (JP); Masayoshi Murayama, Fukuroi (JP); Hiroshi Kida, Fukuroi (JP); Tsutomu Ohtani, Fukuroi (JP); Masaaki Saito, Fukuroi (JP)

(73) Assignee: Pioneer Display Products Corporation, Fukuroi (JP)

( * ) Notice: Subject to any disclaimer, the term of this patent is extended or adjusted under 35 U.S.C. 154(b) by 1125 days.

(21) Appl. No.: 09/987,453

(22) Filed: Nov. 14, 2001

(65) Prior Publication Data
    US 2002/0057896 A1    May 16, 2002

(30) Foreign Application Priority Data
    Nov. 15, 2000    (JP)    ............................. 2000-348700

(51) Int. Cl.
    *H04N 7/10*    (2006.01)

(52) U.S. Cl. .............................. 386/46; 386/68; 386/69
(58) Field of Classification Search .................. 386/68, 386/69
    See application file for complete search history.

(56) References Cited

U.S. PATENT DOCUMENTS

| 5,134,499 | A   | * | 7/1992  | Sata et al. ................... 386/109 |
| 5,832,173 | A   | * | 11/1998 | Terasawa et al. ............. 386/69 |
| 5,896,352 | A   | * | 4/1999  | Takenaka et al. ........ 369/30.07 |
| 6,804,178 | B1  | * | 10/2004 | Tada et al. ............... 369/30.23 |
| 2002/0080277 | A1 | * | 6/2002  | Kida et al. ................... 348/553 |
| 2002/0081091 | A1 | * | 6/2002  | Tada ........................... 386/46 |
| 2002/0109930 | A1 | * | 8/2002  | Saito et al. .................... 360/69 |

FOREIGN PATENT DOCUMENTS

JP            10-234007           9/1998

* cited by examiner

*Primary Examiner*—Robert Chevalier
*Assistant Examiner*—Helen Shibru
(74) *Attorney, Agent, or Firm*—McGinn IP Law Group, PLLC (57) ABSTRACT

An information recording and reproducing apparatus with a ring buffer, in which user can know a state of the ring buffer in a real-time manner and a monitoring method of the ring buffer. A ring buffer monitor image signal is generated which indicates an image showing a relative positional relation of a current recording position and a current reproducing position in the ring buffer.

23 Claims, 8 Drawing Sheets

| ACCESSING ORDER | SECTOR | POSITION IN RING AREA |
|---|---|---|
| 1 | 00000~00019 | 0000 (HEAD) |
| 2 | 00020~00039 | 0001 |
| 3 | 00040~00059 | 0002 |
| 4 | 00060~00079 | 0003 |
| ⋮ | ⋮ | ⋮ |
| n-1 | 98980~98999 | 9998 |
| n | 99000~99019 | 9999 (LAST) |

FIG. 4

| PROGRAM INFORMATION | | | SECTOR |
|---|---|---|---|
| PROGRAM NAME | GENRE | HD/SD | |
| 1 RELAY OF PROFESSIONAL BASEBALL | SPORTS | HD | 00000~02000 |
| 2 NEWS AT 9:00 | NEWS | SD | 02500~05000 |
| 3 SAKANO UENO KUMO | MOVIE | HD | 06000~18000 |
| 4 YOTTE SOUROU | DRAMA | SD | 19000~24000 |

◇ $M_W$ AT THE TIME OF RECORDING OF HDTV BROADCAST PROGRAM

△ $M_R$ AT THE TIME OF REPRODUCTION OF HDTV BROADCAST PROGRAM

◆ $M_W$ AT THE TIME OF RECORDING OF SDTV BROADCAST PROGRAM

▲ $M_R$ AT THE TIME OF REPRODUCTION OF SDTV BROADCAST PROGRAM

M : MOVIE
S : SPORTS
N : NEWS
D : DRAMA

INFORMATION RECORDING AND REPRODUCING APPARATUS WITH A RING BUFFER AND METHOD FOR MONITORING RING BUFFER

BACKGROUND OF THE INVENTION

1. Field of the Invention

The invention relates to an apparatus for recording and reproducing information with a ring buffer for recording and reproducing image signals by using its area circularly.

2. Description of Related Art

In recent years, hard disk recorders are attracting a great attention as a recording device in which a program provided by television broadcast or the like is recorded onto a hard disk instead of a video tape. When a hard disk is used as a recording medium, the following function, for example, can be realized. That is, while the program which is broadcasted is being recorded, the recorded program can be simultaneously reproduced (hereinafter, referred to as a time shift reproduction). A ring buffer area is provided in the hard disk in order to realize the time shift reproduction.

Figure 1:
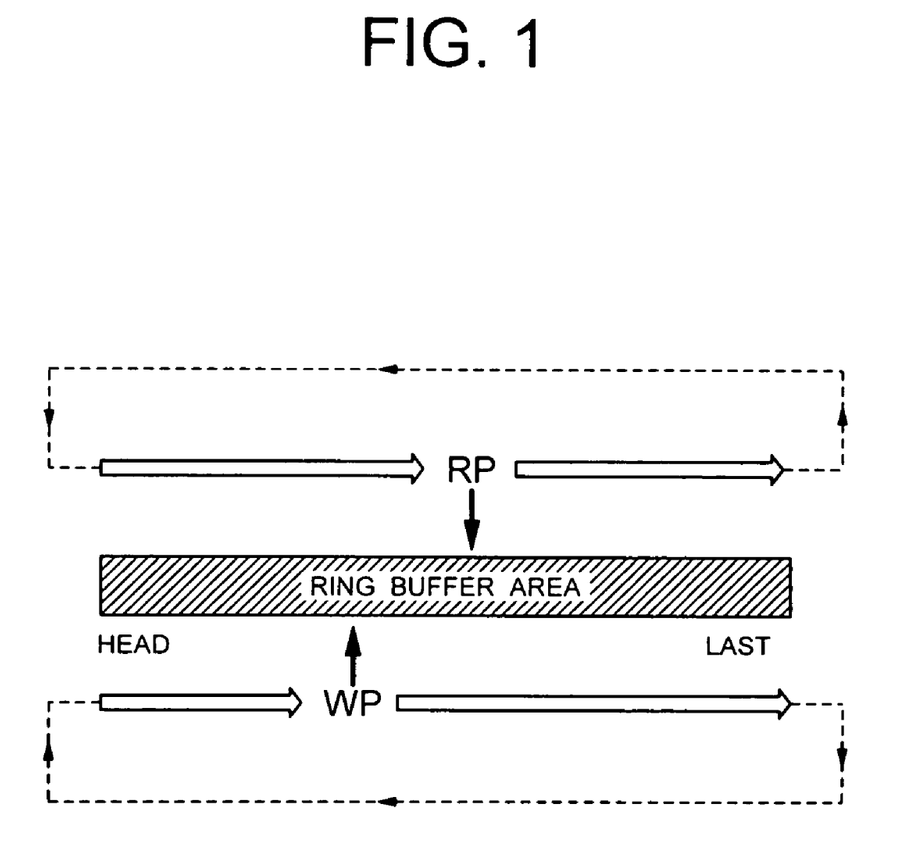
FIG. 1 is a diagram for explaining the recording and reproducing operations in a ring buffer area in the case of the time shift reproduction.

FIG. 1 is a diagram for explaining the recording and reproducing operations in the ring buffer area when performing the time shift reproduction.

In FIG. 1, a write position WP indicates a present recording position in the ring buffer area and a read position RP indicates a present reproducing position in the ring buffer area. These positions WP and RP gradually move independently from a head position to a last position of the ring buffer area, as shown by blank arrows in FIG. 1, respectively. When each of the positions WP and RP reaches the last position, the position returns to the head position and again gradually moves toward the last position. The speed at which each of the positions WP and RP moves depends on the bit rate of a video signal of a broadcast program selected as a recording or reproduction target. In this case, the broadcast program selected as a reproduction target is not limited to the television broadcast but can be a radio broadcast program having audio sounds only.

In the ring buffer area, the continuous recording and reproducing operations in a range from the head to the last of the area are executed respectively and independently. Furthermore, these operations are executed circularly in the area. By the operations described above, the time shift reproduction is executed in which the recorded broadcast program is reproduced from the position shown by RP while the broadcast program provided by the TV broadcast is being recorded to the position in the ring buffer area denoted as WP.

In the digital broadcast channel, broadcast programs of different bit rates such as HDTV (High Definition Television) broadcast programs of high picture quality and SDTV (Standard Definition Television) broadcast programs of a standard picture quality exist mixedly. Therefore, while the HDTV broadcast program of the high bit rate is being recorded, if the SDTV broadcast program of the low bit rate is reproduced in a state where the write position WP and the read position RP are close to each other as shown in FIG. 1, a state where the WP outruns the RP occurs. If the write position WP outruns the read position RP, then contents of the SDTV broadcast program which have not been reproduced yet will be halfway overwritten by the contents of the HDTV broadcast program.

In the time shift reproduction, however, the user cannot previously know the occurrence of the outrunning state as mentioned above.

OBJECTS AND SUMMARY OF THE INVENTION

The invention has been made to solve the above problem, and it is an object of the invention to provide an information recording and reproducing apparatus with a ring buffer which is designed that user can know the state of the ring buffer in real-time and a method of monitoring the ring buffer.

According to the invention, there is provided an information recording and reproducing apparatus with a ring buffer for reading and reproducing an image signal recorded in the ring buffer while writing an image signal supplied as time elapses into the ring buffer, comprising: recording and reproducing position information obtaining means for obtaining information indicative of each of a recording position and a reproducing position at the present time point in the ring buffer; and ring buffer monitor image signal generating means for generating a ring buffer monitor image signal indicative of an image showing a relative positional relation of each of the recording position and the reproducing position in the ring buffer.

According to the invention, there is provided a method of monitoring a ring buffer for use in an information recording and reproducing apparatus with the ring buffer for reading and reproducing an image signal recorded in the ring buffer while writing an image signal supplied as time elapses into the ring buffer, comprising: a ring buffer monitor image signal generating step of generating a ring buffer monitor image signal indicative of an image showing a relative positional relation of each of a recording position and a reproducing position at a present time point in the ring buffer; an image synthesizing step of obtaining a synthesized image signal by synthesizing the image signal reproduced from the ring buffer and the ring buffer monitor image signal; and a display step of displaying images based on the synthesized image signal.

DETAILED DESCRIPTION OF THE PREFERRED EMBODIMENTS

An embodiment of the invention will now be described in detail hereinbelow with reference to the drawings.

Figure 2:
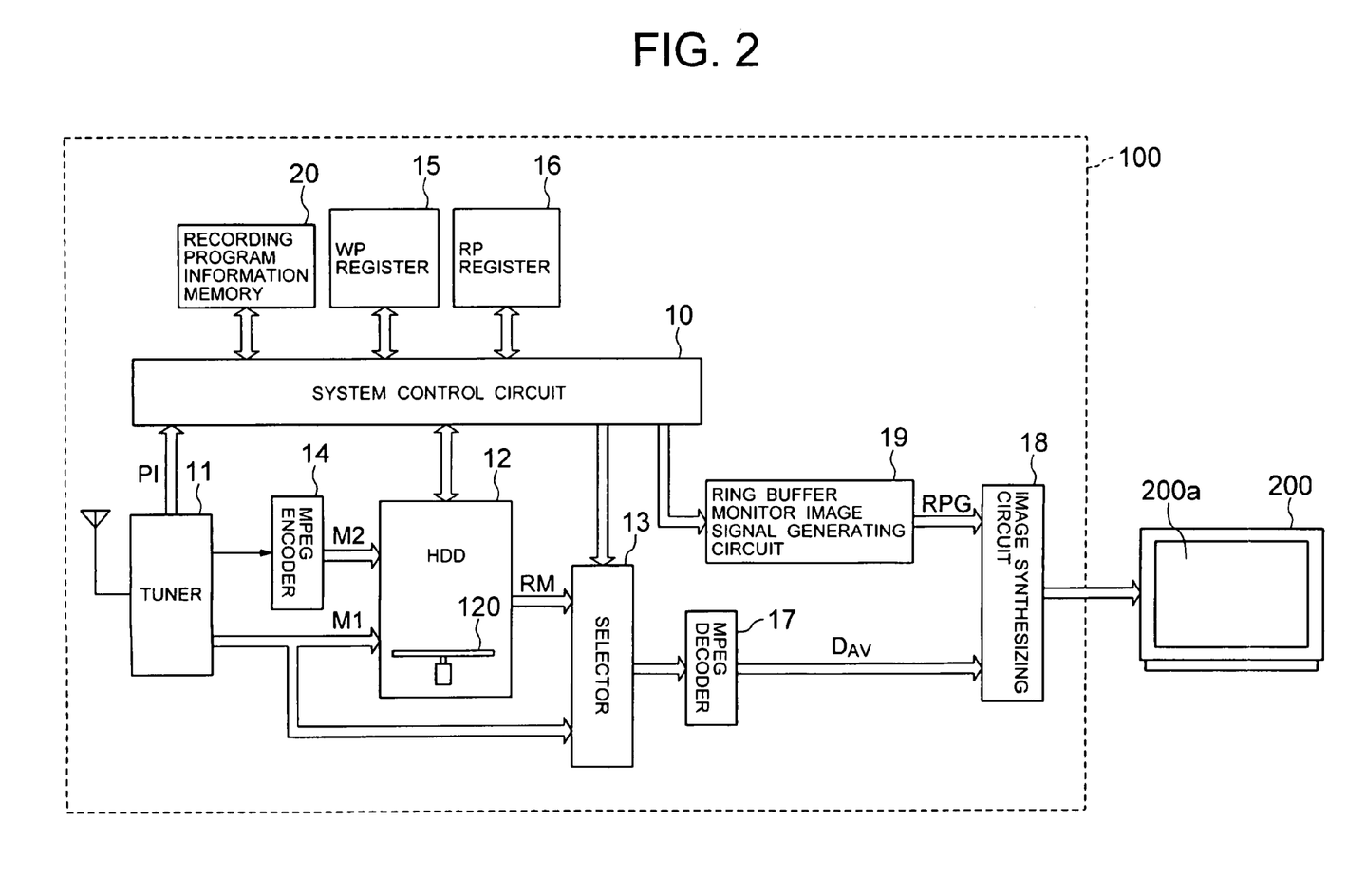
FIG. 2 is a diagram showing an internal construction of an information recording and reproducing apparatus 100 according to the invention.

FIG. 2 is a diagram showing the construction of an information recording and reproducing apparatus 100 according to the invention.

In FIG. 2, when the user executes the channel designating operation of the digital broadcast, a tuner 11 receives a digital broadcast wave of the designated channel. In this state, the tuner 11 obtains an MPEG (Moving Picture Experts Group) signal by demodulating the received digital broadcast wave and supplies it as an MPEG signal M1 to each of a hard disk drive (HDD) 12 and a selector 13. The tuner 11 further retrieves program information PI showing each of a name of a broadcast program, a genre (sports, news, movie, etc.), and a classification of HDTV/SDTV from the digital broadcast wave received as mentioned above and supplies it to a system control circuit 10. When the user executes the channel designating operation of analog television broadcast (NTSC system, PAL system, or SECAM system), the tuner 11 receives an analog television broadcast wave of the designated channel. At this time, the tuner 11 supplies a television signal obtained by demodulating the received analog television broadcast wave to an MPEG encoder 14. The MPEG encoder 14 supplies a signal obtained by performing an MPEG encoding process to the television signal as an MPEG signal M2 to the hard disk drive 12.

Figure 3:
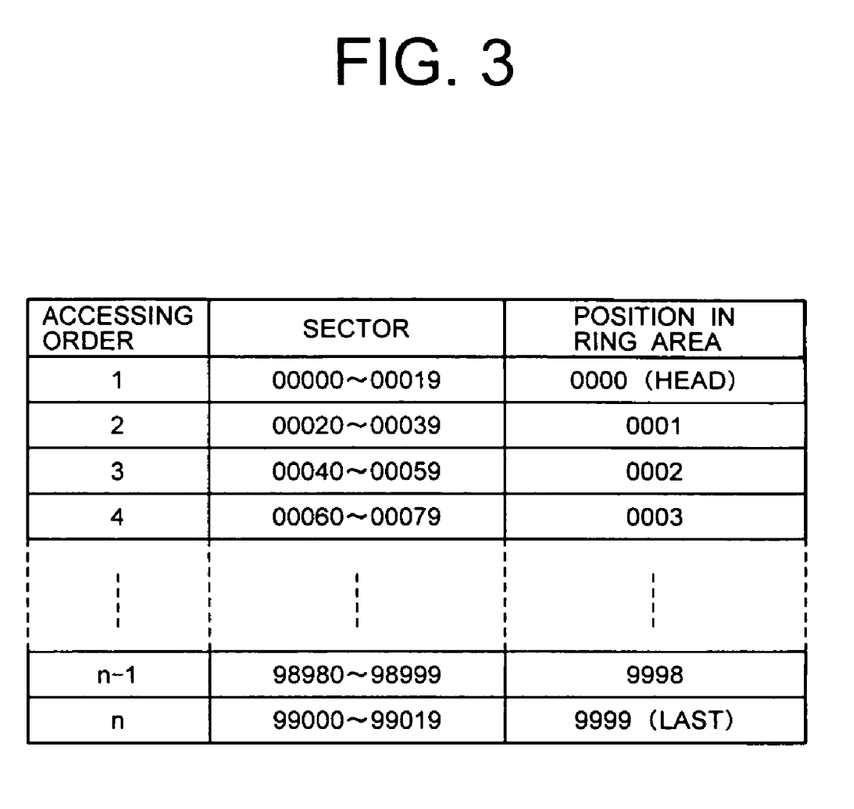
FIG. 3 is a diagram showing a sector/ring area correspondence map.
Figure 4:
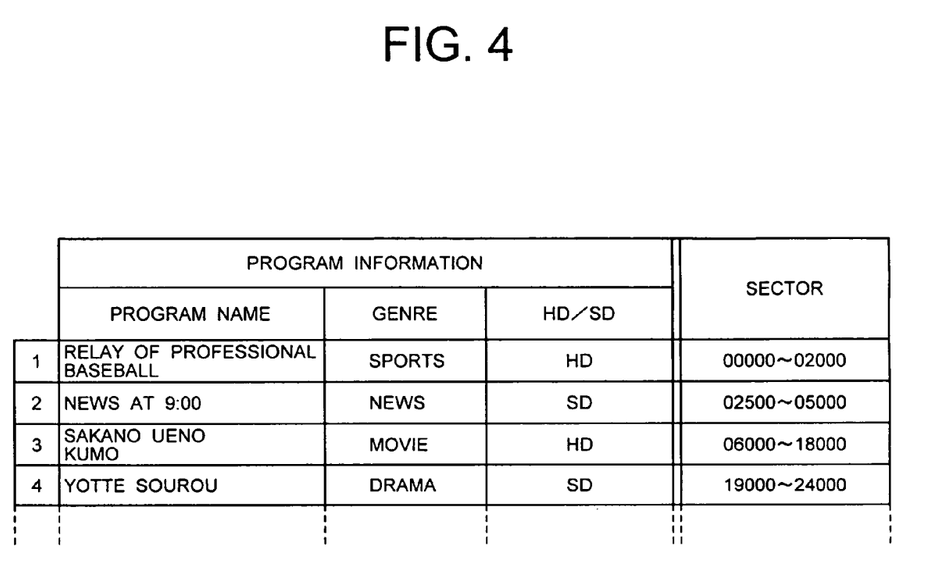
FIG. 4 is a diagram showing an example of program information and recording start position information which are stored into a recording program information memory 20.

The hard disk drive 12 records the MPEG signal M1 or M2 onto a hard disk 120 in response to a recording command signal supplied from the system control circuit 10. In this state, the system control circuit 10 sequentially selects sectors to designate recording positions in the hard disk 120 in accessing order shown in a sector/ring area correspondence map as shown in FIG. 3 and records the MPEG signal M1 or M2 into each sector. In the sector/ring area correspondence map, position information in the ring area showing the relative position of each sector in the ring buffer area has been described correspondingly to each sector as shown in FIG. 3. The system control circuit 10 searches for the position in the ring buffer area of the sector recorded at the present time point from the sector/ring area correspondence map at intervals of a predetermined period and stores it as a write position WP into a write position register 15 by overwriting. Further, the system control circuit 10 fetches the program information of the program recorded as mentioned above, detects a sector number showing the recording position of the program in the hard disk 120, and writes both of them into a recording program information memory 20 in correspondence to each other as shown in FIG. 4.

The hard disk drive 12 reproduces the MPEG signal recorded in the ring buffer area on the hard disk 120 as shown in FIG. 1 in response to a reproduction command signal supplied from the system control circuit 10 and supplies it as a reproduction MPEG signal RM to the selector 13. At this time, the system control circuit 10 reproduces the recording information from each sector in the hard disk 120 in accessing order shown in the sector/ring area correspondence map as shown in FIG. 3 and sets it as a reproduction MPEG signal RM. During this period of time, the system control circuit 10 searches for the position in the ring buffer area of the sector reproduced at the present time point from the sector/ring area correspondence map at intervals of a predetermined period and stores it as a read position RP into a read position register 16 by overwriting. The ring buffer area can be also reconstructed or a size of its area can be also changed. In this case, the sector/ring area correspondence map is rewritten in response to a reconstruction command.

The selector 13 alternatively selects the signal corresponding to a selection signal supplied from the system control circuit 10 between the reproduction MPEG signal RM supplied from the hard disk drive 12 and the MPEG signal M1 supplied from the tuner 11 and supplies the selected signal to an MPEG decoder 17. The MPEG decoder 17 obtains a video data signal by performing an MPEG decoding process to the MPEG signal supplied from the selector 13 and supplies it as a video data signal $D_{AV}$ to an image synthesizing circuit 18.

Figure 5A:
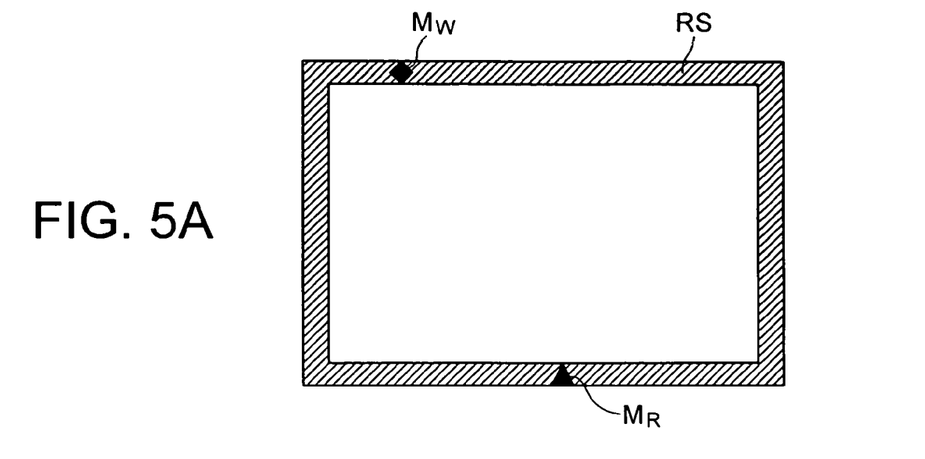
FIGS. 5A to 5C are diagrams showing an example of a ring buffer monitor image.

A ring buffer monitor image signal generating circuit 19 generates image data indicative of a ring buffer monitor image as shown in FIG. 5A on the basis of the ring buffer area state information supplied from the system control circuit 10. The ring buffer monitor image signal generating circuit 19 generates a ring buffer monitor image signal RPG in order to allow the ring buffer monitor image based on the image data to be displayed at four sides of a screen 200a of a display device 200 and supplies it to the image synthesizing circuit 18. In FIG. 5A, a ring buffer stripe RS shows the whole ring buffer area of the hard disk 120 in a band shape. A recording position mark $M_W$ relatively shows the present recording position in the ring buffer area onto the ring buffer stripe RS. Further, a reproducing position mark $M_R$ relatively shows the present reproducing position in the ring buffer area onto the ring buffer stripe RS.

Figure 5B:
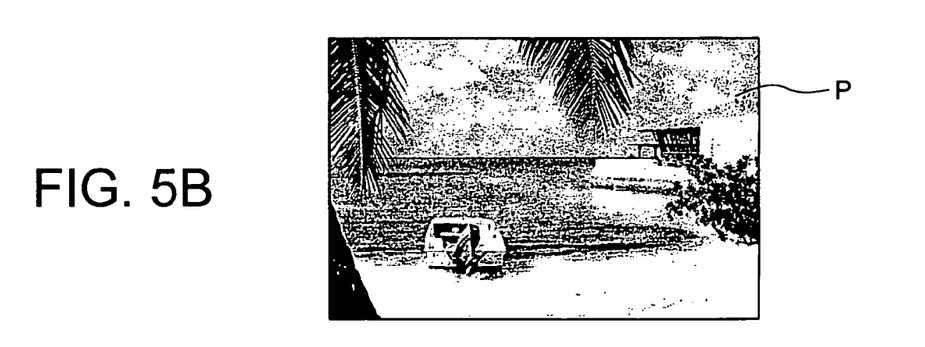

The image synthesizing circuit 18 generates a synthesized video signal obtained by synthesizing an image P which is expressed by the video data signal $D_{AV}$ supplied from the MPEG decoder 17 and is as shown in FIG. 5B and the ring buffer monitor image which is expressed by the ring buffer monitor image signal RPG and is as shown in FIG. 5A and supplies it to the display device 200.

Figure 5C:
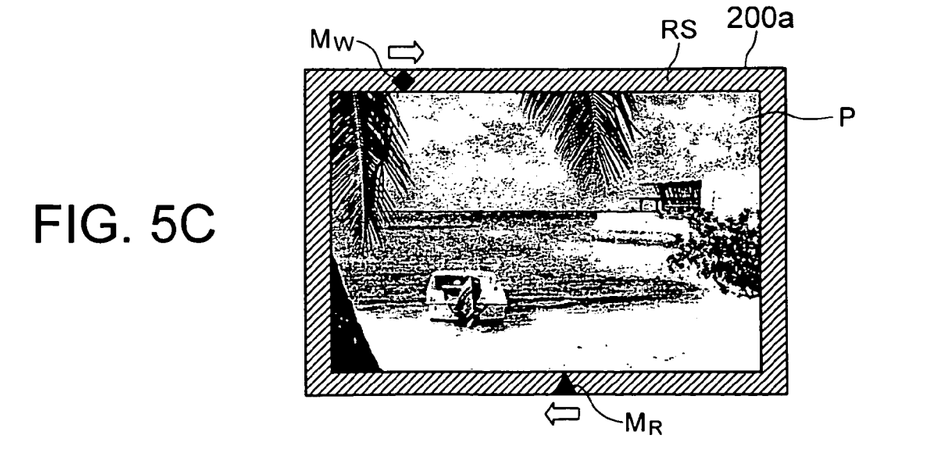

In accordance with the synthesized video signal supplied from the image synthesizing circuit 18, the display device 200 displays the image P as shown in FIG. 5B expressed by the video data signal $D_{AV}$ onto the center portion of the screen 200a as shown in FIG. 5C. The display device 200 further displays the ring buffer monitor image shown in FIG. 5A onto the peripheral portion of the screen 200a as shown in FIG. 5C. That is, while the program received by the tuner 11 or the program reproduced from the hard disk drive 12 is being displayed onto the center portion of the screen, the display device 200 displays the ring buffer monitor image for monitoring the state in the ring buffer area onto the peripheral portion of the screen.

When the ring buffer monitor image as shown in FIG. 5A is generated, the system control circuit 10 retrieves values stored in each of the write position register 15 and read position register 16 every other predetermined interval. That is, the system control circuit 10 retrieves the write position WP showing the recording position in the ring buffer area at the present time point and the read position RP showing the reproducing position in the ring buffer area at the present time point. The system control circuit 10 supplies each of the write position WP and the read position RP as buffer area state information to the ring buffer monitor image signal generating circuit 19. The ring buffer monitor image signal generating circuit 19, therefore, generates image data obtained by multiplexing the recording position mark $M_W$ as shown in FIG. 5A to the position on the ring buffer stripe RS corresponding to the WP and generates image data obtained by multiplexing the reproducing position mark $M_R$ to the position on the ring buffer stripe RS corresponding to the RP, respectively. That is, the recording position mark $M_W$ is multiplexed and displayed at the position on the ring buffer stripe RS corresponding to the recording position at the present time point on the ring buffer area, and the reproducing position mark $M_R$ is multiplexed and displayed at the position on the ring buffer stripe RS corresponding to the reproducing position at the present time point on the ring buffer area, respectively.

The recording position mark $M_W$ displayed by the display device 200 as shown in FIG. 5C is, therefore, gradually moved on the ring buffer stripe RS in the direction shown by an arrow in accordance with a speed at which the program is recorded into the ring buffer area. The reproducing position mark $M_R$ is, further, gradually moved on the ring buffer stripe RS in the direction shown by an arrow in accordance with a speed at which the program is reproduced from the ring buffer area.

The user, therefore, can successively know the recording position and reproducing position at the present time point in the ring buffer area upon time shift reproduction with reference to the ring buffer monitor image displayed on the peripheral portion of the screen 200a as shown in FIG. 5C.

The form of the ring buffer monitor image is not limited to that shown in FIG. 5A.

Figure 6:
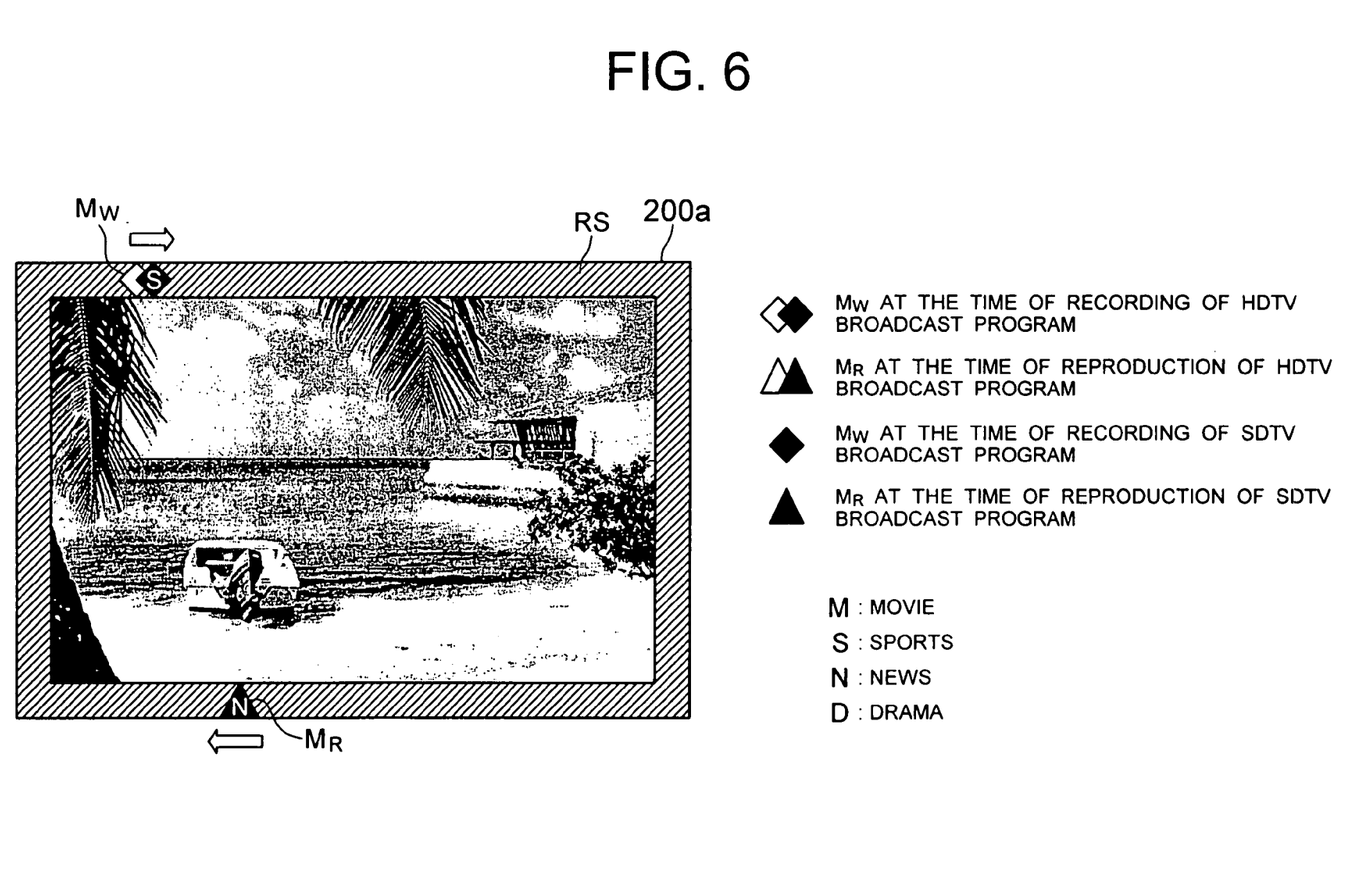
FIG. 6 is a diagram showing another example of a ring buffer monitor image.

For example, as shown in FIG. 6, the recording position mark $M_W$ can be also displayed in a form such that it is possible to identify which one of the HDTV broadcast program or the SDTV broadcast program the program serving as a recording target at the present time point is. Similarly, the reproducing position mark $M_R$ is displayed in a form such that it is possible to identify which one of the HDTV broadcast program or the SDTV broadcast program the program serving as a reproduction target at the present time point is. In this case, as shown in FIG. 6, information indicative of a genre of the program which is currently selected as a recording item is held in the recording position mark $M_W$ and information indicative of a genre of the program which is currently selected as a reproducing item is held in the reproducing position mark $M_R$. For example, according to the recording position mark $M_W$ and the reproducing position mark $M_R$ shown in FIG. 6, the user can confirm a state where the sports program by the HDTV broadcast is currently being recorded while the news program by the SDTV broadcast is being reproduced.

Figure 7:
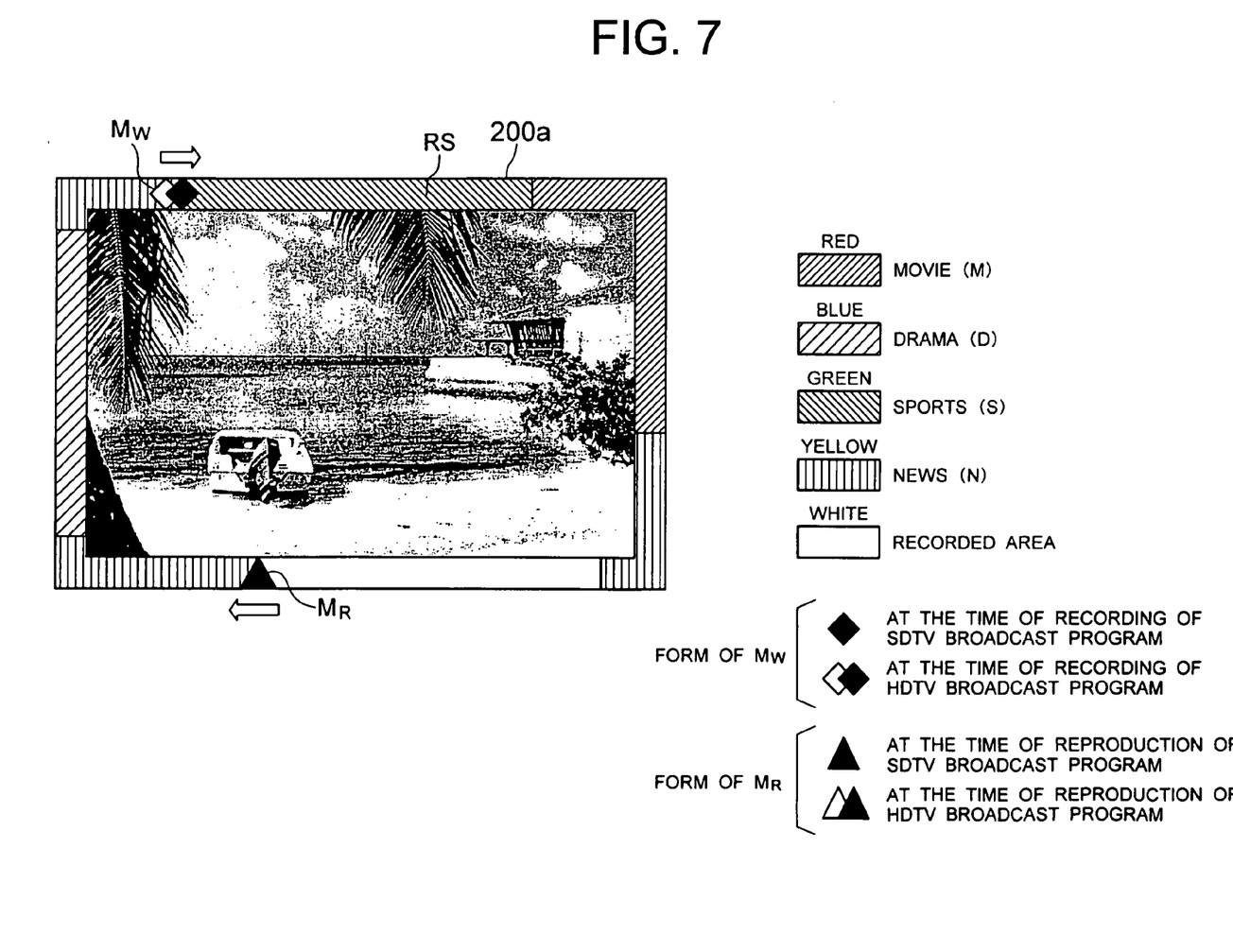
FIG. 7 is a diagram showing another example of a ring buffer monitor image.

Delimiters of all programs recorded in the ring buffer area can be also shown on the ring buffer stripe RS as shown in FIG. 7. In an example shown in FIG. 7, each program recorded in the ring buffer area is classified on the ring buffer stripe RS by the color corresponding to the genre (movie, drama, sports, news, etc.) of the program. Further, in a ring buffer monitor image shown in FIG. 7, the portion which has already been reproduced by the time shift reproducing operation is shown by a white display on the ring buffer stripe RS.

Figure 8:
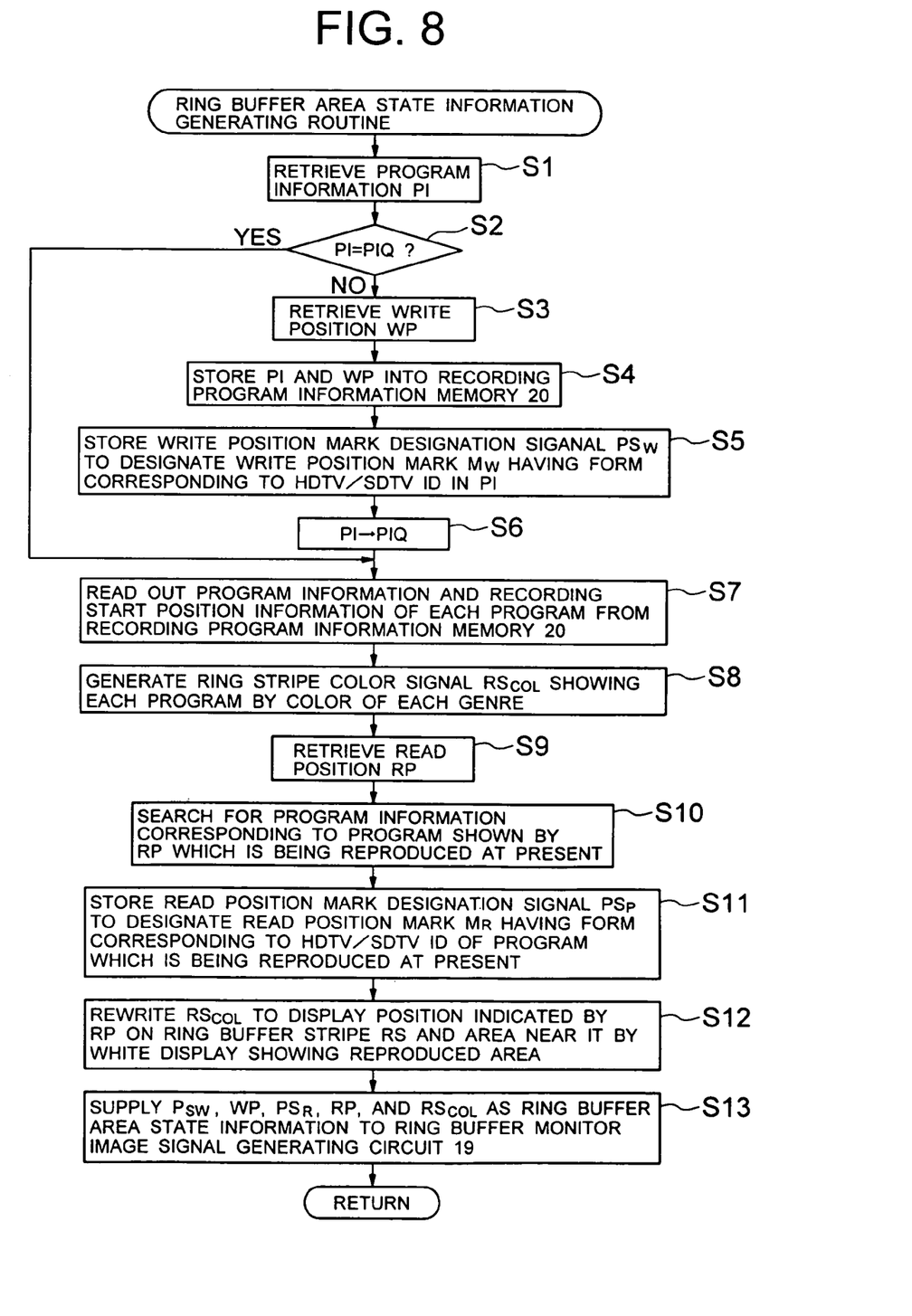
FIG. 8 is a diagram showing a ring buffer area state information generating routine.

FIG. 8 is a diagram showing a ring buffer area state information generating routine which is executed by the system control circuit 10 every other predetermined period in order to generate the ring buffer monitor image shown in FIG. 6 or 7.

In FIG. 8, first, the system control circuit 10 retrieves the program information PI supplied from the tuner 11 (step S1). Whether the program information PI is the same as program information PIQ which was obtained previously or not is discriminated (step S2). If it is determined in step S2 that the program information PI and the program information PIQ are not identical, that is, if it is decided that the program has been switched to a new program, the system control circuit 10 retrieves the write position WP stored in the write position register 15 (step S3). Subsequently, the system control circuit 10 sets the write position WP to a recording start position and writes it once into the recording program information memory 20 in correspondence to the program information PI as shown in FIG. 4 (step S4). The system control circuit 10 selects the form indicated by HDTV/SDTV identification information in the program information PI from the forms of the recording position mark $M_W$ as shown in FIG. 7. A recording position mark designation signal $PS_W$ is stored into a built-in register (not shown) in order to designate the recording position mark $M_W$ having the selected form (step S5). Subsequently, the system control circuit 10 stores the program information PI as program information PIQ into the built-in register (step S6).

After completion of the execution of step S6 or if it is decided in step S2 that the program information PI and the program information PIQ are identical, the system control circuit 10 reads out program information of all programs stored in the recording program information memory 20 as shown in FIG. 4 and recording start position information of each program (step S7). Subsequently, the system control circuit 10 obtains a relative position of each program on the ring buffer stripe RS on the basis of the recording start position information of each program. As shown in FIG. 7, a ring stripe color signal $RS_{COL}$ showing the position of each program on the ring buffer stripe RS by the color corresponding to the genre of the program is generated and stored into the built-in register (step S8). The system control circuit 10 retrieves the read position RP stored in the read position register 16 (step S9). Subsequently, the system control circuit 10 searches for the program information corresponding to the program which is indicated by the read position RP and is currently being reproduced based on the recording start position information of each program (step S10). The system control circuit 10 selects the form indicated by HDTV/SDTV identification information in the program information corresponding to the program which is currently being reproduced from the forms of the reproducing position mark $M_R$ as shown in FIG. 7. A reproducing position mark designation signal $PS_R$ is stored into the built-in register in order to designate the reproducing position mark $M_R$ having the selected form (step S1). Subsequently, the system control circuit 10 rewrites the ring stripe color signal $RS_{COL}$ in order to display the position shown by the read position RP on the ring buffer stripe RS and an area near it by a white display indicative of the reproduced area (step S12). The system control circuit 10 supplies the recording position mark designation signal $PS_W$, write position WP, reproducing position mark designation signal $PS_R$ read position RP, and ring stripe color signal $RS_{COL}$ as ring buffer area state information to the ring buffer monitor image signal generating circuit 19 (step S13). The ring buffer monitor image signal generating circuit 19, consequently, generates the ring buffer monitor image signal RPG in order to allow the ring buffer monitor image onto which the recording position mark $M_W$ and the reproducing position mark $M_R$ have been multiplexed to be displayed onto the ring buffer stripe RS onto the peripheral portion in the screen 200a as shown in FIG. 7.

That is, by the execution of step S13, the ring buffer monitor image signal generating circuit 19 allows the ring buffer stripe RS having a color arrangement according to the ring stripe color signal $RS_{COL}$ to be displayed onto the peripheral portion in the screen 200a. Further, the ring buffer monitor image signal generating circuit 19 allows the recording position mark $M_W$ having the form indicated by the recording position mark designation signal $PS_W$ to be displayed at the position on the ring buffer stripe RS shown by the write position WP. At the same time, the ring buffer monitor image signal generating circuit 19 allows the reproducing position mark $M_R$ having the form indicated by the reproducing position mark designation signal $PS_R$ to be displayed at the position on the ring buffer stripe RS shown by the read position RP.

After completion of the execution of step S13, the system control circuit 10 exits the ring buffer area state information generating routine as shown in FIG. 8 and returns to the execution of a main routine (not shown).

By the execution of the routine of generating ring buffer area state information, the user can visually confirm not only the position in the ring buffer to which the recording and reproduction have been performed at the present time point but also the positional relation and genre of each program recorded in the ring buffer.

According to the invention as described in detail above, the state of the ring buffer can be monitored in real-time while executing the reproduction simultaneously with the recording.

This invention is based on Japanese Patent Application No. 2000-348700 which is herein incorporated by reference.

What is claimed is:

1. An information recording and reproducing apparatus with a ring buffer for reading and reproducing an image signal recorded in the ring buffer while writing an image signal supplied as time elapses into the ring buffer, comprising:
a recording and reproducing position information obtaining part for obtaining information indicative of each of a recording position and a reproducing position at a present time point in said ring buffer; and
a ring buffer monitor image signal generating part for generating a ring buffer monitor image signal indicative of an image showing a relative positional relation of each of said recording position and said reproducing position in said ring buffer.

2. An apparatus according to claim 1, further comprising:
an image synthesizing part for outputting a synthesis image signal obtained by synthesizing said image signal reproduced from said ring buffer and said ring buffer monitor image signal.

3. An apparatus according to claim 1, wherein said ring buffer monitor image signal generating part generates an image signal, as said ring buffer monitor image signal, for allowing a recording position mark to be displayed at a position corresponding to said recording position on a peripheral area of a screen of a display device and allowing a reproducing position mark to be displayed at a position corresponding to said reproducing position on said peripheral area, respectively.

4. An apparatus according to claim 3, wherein said ring buffer monitor image signal generating part changes a form of said reproducing position mark in accordance with a bit rate of said image signal reproduced from said ring buffer and changes a form of said recording position mark in accordance with a bit rate of said image signal to be recorded into said ring buffer.

5. An apparatus according to claim 3, wherein said ring buffer monitor image signal generating part changes a form of said reproducing position mark in accordance with a genre of a program based on said image signal reproduced from said ring buffer and changes a form of said recording position mark in accordance with a genre of a program based on said image signal to be recorded into said ring buffer.

6. An apparatus according to claim 1, wherein said ring buffer monitor image signal generating part generates an image signal, as said ring buffer monitor image signal, for allowing a ring buffer stripe showing a whole area of said ring buffer to be displayed onto a peripheral area of a screen of a display device, for allowing a recording position mark to be multiplexed and displayed at a position corresponding to said recording position on said ring buffer stripe, and for allowing a reproducing position mark to be multiplexed and displayed at a position corresponding to said reproducing position on said ring buffer stripe, respectively.

7. An apparatus according to claim 6, wherein each delimiter of a plurality of programs based on said image signal recorded in said ring buffer is shown on said ring buffer stripe.

8. An apparatus according to claim 6, wherein said ring buffer monitor image signal generating part generates said ring buffer monitor image signal in order to allow the position on said ring buffer stripe corresponding to a reproduced portion in said ring buffer to be displayed in a predetermined form.

9. An information recording and reproducing apparatus with a ring buffer for reading and reproducing an image signal recorded in the ring buffer while writing an image signal supplied as time elapses into the ring buffer, comprising:
a recording and reproducing position information obtaining part for obtaining information indicative of each of a recording position and a reproducing position at a present time point in said ring buffer; and
a ring buffer monitor image signal generating part for generating a ring buffer monitor image signal for allowing a recording position mark to be displayed at a position corresponding to said recording position on a peripheral area of a screen of a display device and allowing a reproducing position mark to be displayed at a position corresponding to said reproducing position on said peripheral area, respectively.

10. A monitoring method of a ring buffer in an information recording and reproducing apparatus with the ring buffer for reading and reproducing an image signal recorded in the ring buffer while writing an image signal supplied as time elapses into the ring buffer, comprising:
a ring buffer monitor image signal generating step of generating a ring buffer monitor image signal indicative of an image showing a relative positional relation of each of a recording position and a reproducing position at a present time point in said ring buffer;
an image synthesizing step of obtaining a synthesis image signal by synthesizing said image signal reproduced from said ring buffer and said ring buffer monitor image signal; and
a display step of displaying on the basis of said synthesis image signal.

11. A method according to claim 10, wherein in said ring buffer monitor image signal generating step, an image signal is generated as said ring buffer monitor image signal in order to allow a recording position mark to be displayed at a position corresponding to said recording position on a peripheral area of a screen of a display device and allow a reproducing position mark to be displayed at a position corresponding to said reproducing position on said peripheral area, respectively.

12. A method according to claim 11, wherein in said ring buffer monitor image signal generating step, a form of said reproducing position mark is changed in accordance with a bit rate of said image signal reproduced from said ring buffer and a form of said recording position mark is changed in accordance with a bit rate of said image signal to be recorded into said ring buffer.

13. A method according to claim 11, wherein in said ring buffer monitor image signal generating step, a form of said reproducing position mark is changed in accordance with a genre of a program based on said image signal reproduced from said ring buffer and a form of said recording position mark is changed in accordance with a genre of a program based on said image signal to be recorded into said ring buffer.

14. A method according to claim 10, wherein in said ring buffer monitor image signal generating step, an image signal is generated as said ring buffer monitor image signal in order to allow a ring buffer stripe showing a whole area of said ring buffer to be displayed onto a peripheral area of a screen of a display device, allow a recording position mark to be multiplexed and displayed at a position corresponding to said recording position on said ring buffer stripe, and allow a reproducing position mark to be multiplexed and displayed at a position corresponding to said reproducing position on said ring buffer stripe, respectively.

15. A method according to claim 14, wherein each delimiter of a plurality of programs based on said image signal recorded in said ring buffer is shown on said ring buffer stripe.

16. A method according to claim 14, wherein in said ring buffer monitor image signal generating step, said ring buffer monitor image signal is generated in order to allow the position on said ring buffer stripe corresponding to a reproduced portion in said ring buffer to be displayed in a predetermined form.

17. A monitoring method of a ring buffer in an information recording and reproducing apparatus with a ring buffer for reading and reproducing an image signal recorded in the ring buffer while writing an image signal supplied as time elapses into the ring buffer, comprising:
  a recording and reproducing position information obtaining step of obtaining information indicative of each of a recording position and a reproducing position at a present time point in said ring buffer;
  a ring buffer monitor image signal generating step of generating a ring buffer monitor image signal for allowing a recording position mark to be displayed at a position corresponding to said recording position on a peripheral area of a screen of a display device and allowing a reproducing position mark to be displayed at a position corresponding to said reproducing position on said peripheral area, respectively;
  an image synthesizing step of obtaining a synthesis image signal by synthesizing said image signal reproduced from said ring buffer and said ring buffer monitor image signal; and
  a display step of displaying on the basis of said synthesis image signal.

18. An apparatus according to claim 1, wherein said peripheral area of said screen of said display device includes four sides of said screen of said display device.

19. An apparatus according to claim 2, wherein said image signal reproduced from said ring buffer is displayed onto a center portion of a screen of a display device, and said ring buffer monitor image signal is displayed onto a peripheral area of the screen of said display device.

20. An apparatus according to claim 6, wherein said peripheral area of said screen of said display device includes four sides of said screen of said display device.

21. A method according to claim 9, wherein said peripheral area of said screen of said display device includes four sides of said screen of said display device.

22. A method according to claim 10, wherein said display step includes:
  displaying said image signal reproduced from said ring buffer onto a center portion of a screen of a display device, and
  displaying said ring buffer monitor image signal onto a peripheral area of the screen of said display device.

23. An apparatus according to claim 14, wherein said peripheral area of said screen of said display device includes four sides of said screen of said display device.

* * * * *